C. MAHAN.
APPARATUS FOR COATING CANDIES WITH SUGAR.
APPLICATION FILED JUNE 17, 1911.

1,012,877.

Patented Dec. 26, 1911.
2 SHEETS—SHEET 1.

Witnesses
Inventor
Charles Mahan,
By
Attorneys

C. MAHAN.
APPARATUS FOR COATING CANDIES WITH SUGAR.
APPLICATION FILED JUNE 17, 1911.
1,012,877.
Patented Dec. 26, 1911.
2 SHEETS—SHEET 2.
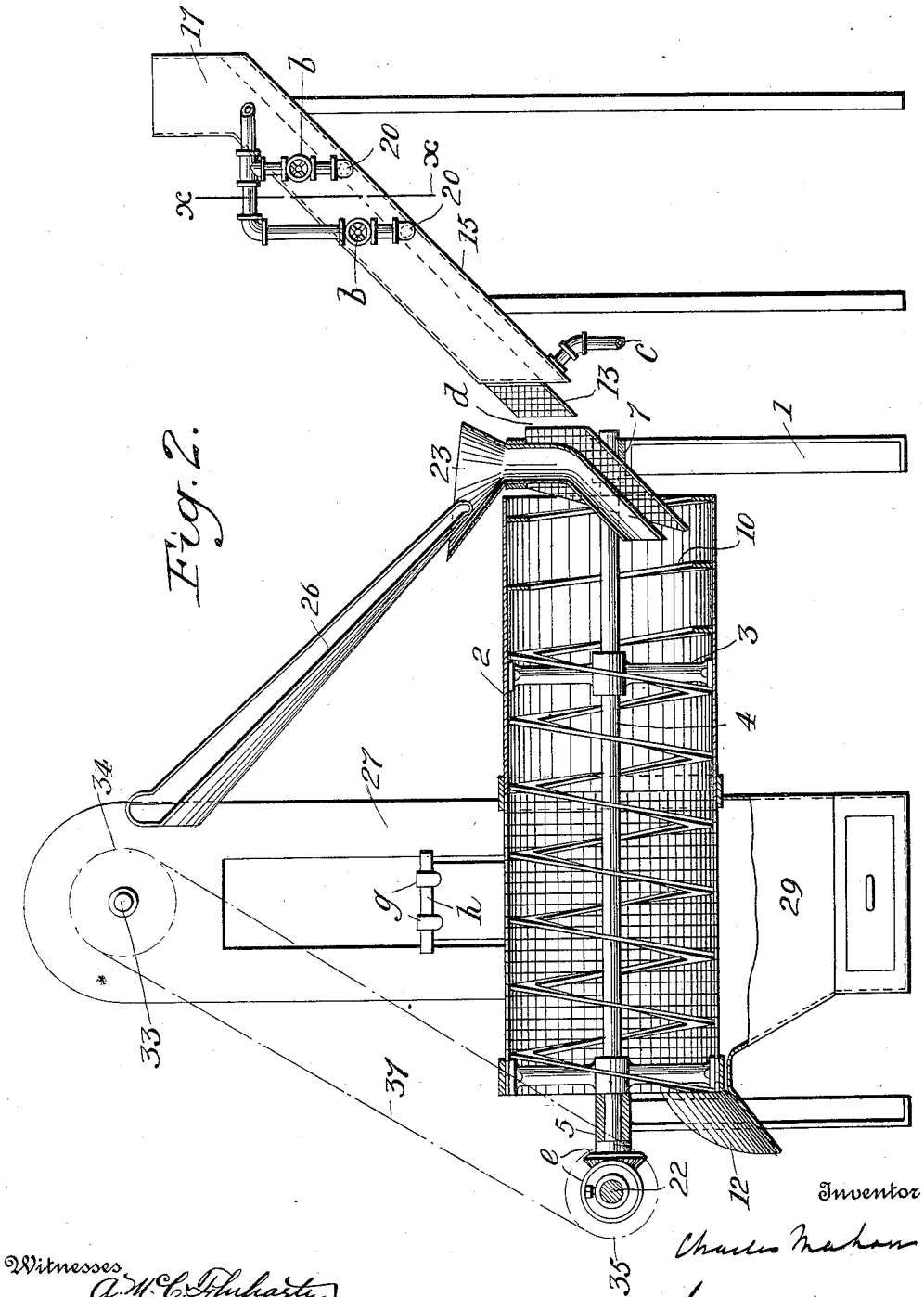

UNITED STATES PATENT OFFICE.

CHARLES MAHAN, OF BALTIMORE, MARYLAND.

APPARATUS FOR COATING CANDIES WITH SUGAR.

1,012,877.

Specification of Letters Patent.

Patented Dec. 26, 1911.

Application filed June 17, 1911. Serial No. 633,748.

*To all whom it may concern:*

Be it known that I, CHARLES MAHAN, of the city of Baltimore and State of Maryland, have invented certain Improvements in Apparatus for Coating Candies with Sugar, of which the following is a specification.

This invention relates to certain improvements in the apparatus for coating candies with sugar shown and described in Letters Patent No. 945,355 granted to Charles H. Wild, and Charles Mahan, on the 4th day of January, 1910 to which reference should be made.

The present invention consists principally, in a peculiar construction of the apparatus whereby the moistening of candies and particularly gum drops, during a part of the coating operation, is effected by sprays of water, syrup or other liquid, instead of by steam as in the patented invention; the object of the change being to prevent the clouding by escaping steam, the atmosphere of the building in which the apparatus is erected, and the softening of the candy by heat.

The said invention consists further in other improvements in the construction of the apparatus looking to its greater efficiency, as will hereinafter fully appear.

In the description of the present invention which follows reference is made to the accompanying drawings, forming a part hereof, and in which,—

Figure 1:
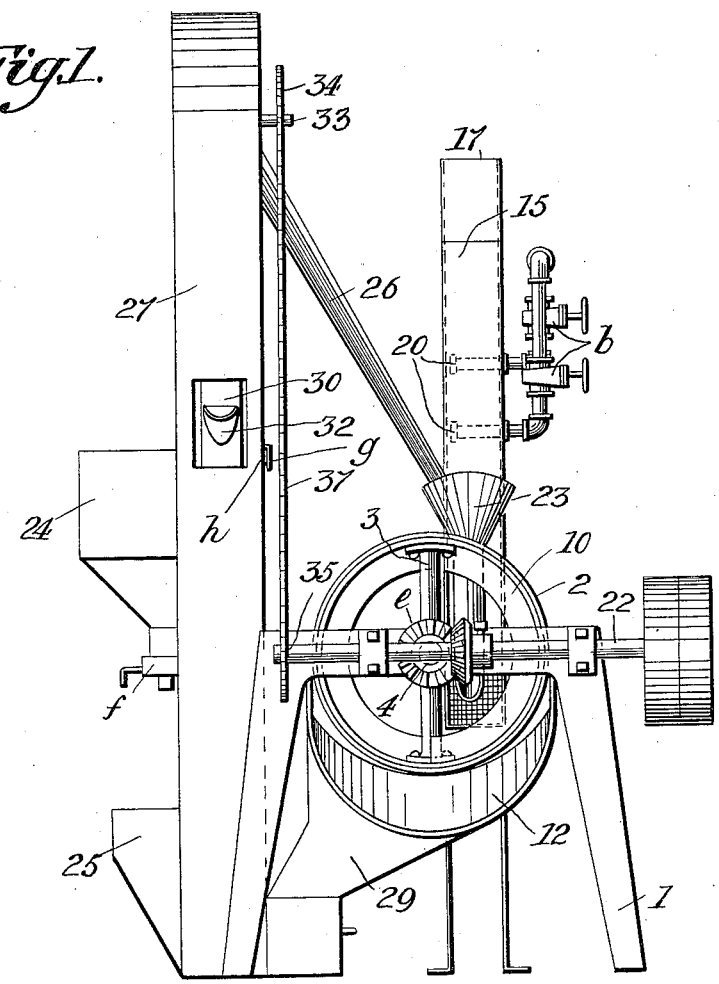
Figure 3:
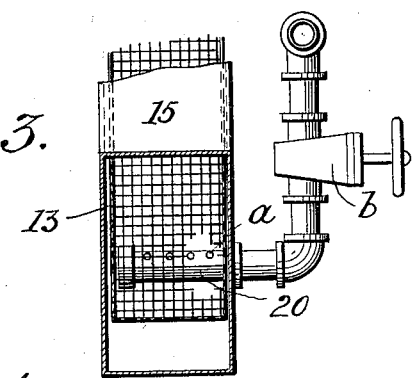

Figure 1 is a front elevation of the improved apparatus, and Fig. 2 is a partly sectional side view of the same. Fig. 3 is an enlarged section taken on the dotted line *x—x*, in Fig. 2.

Referring now to the drawings, 1 is the frame of the apparatus, and 2 a cylinder in two longitudinal sections the wall of one of which is imperforate and that of the other reticulated. Both ends of the cylinder are open. The cylinder 2 is secured by means of the arms 3 to the rotary shaft 4 which is supported in the bearings 5 and 7 forming parts of the frame 1. Within the cylinder 2 and adapted to rotate with it, is an internal spiral flange 10, a part of which to the right of Fig. 1 is shown in section; and the object of said flange is to carry the materials introduced into the cylinder from right to left, and discharge certain of them from the spout 12.

At the entrance end of the apparatus, and leading to the cylinder 2, is an inclined stationary chute 13 of wire-work which is inclosed in a water-tight casing 15 having a hopper 17 at its upper end into which the gum drops to be coated with sugar are introduced. Within the water-tight casing, and beneath the wire-work chute 13, are horizontal perforated pipes 20 which are connected by suitable pipes to a supply of liquid under pressure. The perforations *a* in the pipes 20 are so arranged that liquid in the form of spray is forced through the bottom of the wire-work chute 13 and among the gum drops therein which are thereby moistened on their surface, without being heated as is the case when steam is employed. Suitable valves *b* control the admission of liquid to the pipes 20, and the surplus liquid runs down the bottom of the casing 15 and escapes through the drain pipe *c*.

By reference to Fig. 2 it will be seen that the portion of the wire-work chute 13 which is within the imperforate section of the cylinder 2, is not attached to the part which is within the casing 15, there being a space *d* between the two parts. This space is to prevent any liquid not carried off by the pipe *c*, entering the rotary cylinder 2; and it will be understood that due to the speed at which the gum drops roll down the wire-work chute, they will bridge the space and not fall through it.

The rotary shaft 4 is driven from the transversely extending driving shaft 22 through the medium of the miter gears *e, e* and is journaled in bearings forming parts of the frame 1 as shown in Fig. 1.

The granulated sugar to coat the moistened gum drops as they are conveyed through the rotary cylinder 2 is introduced into a hopper 24 having a spout provided with a discharge-regulating gate *f* which is directly over a second hopper 25 in communication with an elevator which discharges the sugar into a funnel 23 the lower end of which is within the cylinder 2. The hopper 25 is also in communication with a box 29 which is directly underneath the reticulated section of the said cylinder. The elevator consists of a box 27 having an upper and a lower drum, neither of which is shown. The two drums carry an endless conveyer belt 30 a part of which, together with a bucket 32, is seen through an opening in the box, in Fig. 1. The shaft 33 to which the upper drum in the elevator is fastened, is driven from the shaft 22 by means of the sprocket wheels 34 and 35 and the sprocket chain 37. The buckets discharge the sugar into a spout 26 the lower end of which is within the funnel 23. The hopper 24 is supported by means of hooks $g$ from a bar $h$ which extends across the space between the two legs of the elevator box 27 as shown in Figs. 1 and 2.

Supposing gum drops which are of a gelatinous nature and practically dry, to be rolling down the chute 13 into the cylinder 2 which is in rotation and receiving granulated sugar from the spout 26 and the funnel 23, and that liquid in the form of a spray is issuing through the apertures $a$ in the pipes 20, the gum drops in passing through the spray will become moistened without being softened except at the surface and upon reaching the granulated sugar are mixed therewith and become coated and are carried along to the discharge spout 12, the unused sugar falling through the reticulated wall of the cylinder to the box 29 from which it passes to the elevator 27 and is again conducted to the cylinder in the manner described.

With this apparatus, the quantity of liquid to provide the required spray through which the gum drops pass, can be readily regulated by the valves $b$; and a proper supply of sugar is maintained by the adjustment of the gate-valve $f$ in the spout of the hopper 24.

I claim as my invention,—

1. In an apparatus for the purpose described, appliances to mix gum drops with granulated sugar, and other means to produce a spray of liquid through which the gum drops pass and are thereby moistened without being softened by heat before coming in contact with the sugar, substantially as specified.

2. In an apparatus for coating gum drops with granulated sugar, a rotary cylinder having therein a screw conveyer, and appliances to introduce the sugar into the cylinder, combined with means to convey the gum drops into the cylinder, and other means to produce a spray of liquid through which the gum drops pass without being softened by heat before entering the cylinder, substantially as specified.

3. In an apparatus to coat gum drops with granulated sugar, a rotary cylinder having therein a screw conveyer, and appliances to introduce the sugar into the cylinder, combined with an inclined reticulated chute to convey the gum drops into the cylinder, and means to inject into the reticulated chute, a spray of liquid through which the gum drops will pass without being softened by heat before reaching the cylinder, substantially as specified.

4. In an apparatus to coat gum drops with granulated sugar, a rotary cylinder having therein a screw conveyer, and appliances to introduce the sugar into the cylinder, combined with an inclined reticulated chute to convey the gum drops to the cylinder, a water-tight casing for the chute, and a perforated pipe situated between the casing and the chute, adapted to inject liquid in the form of spray of limited content through the said chute and into the path taken by the gum drops in passing to the cylinder, substantially as specified.

CHARLES MAHAN.

Witnesses:
Wm. T. Howard,
Julia B. Robinson.

Copies of this patent may be obtained for five cents each, by addressing the "Commissioner of Patents, Washington, D. C."